April 19, 1960  M. MOLLICK ET AL  2,932,973
INSTRUMENTS

Filed April 9, 1957  3 Sheets-Sheet 1

INVENTORS
Milton Mollick
BY Edmund D. Haigler

Pollard, Johnston, Smythe + Robertson
ATTORNEYS

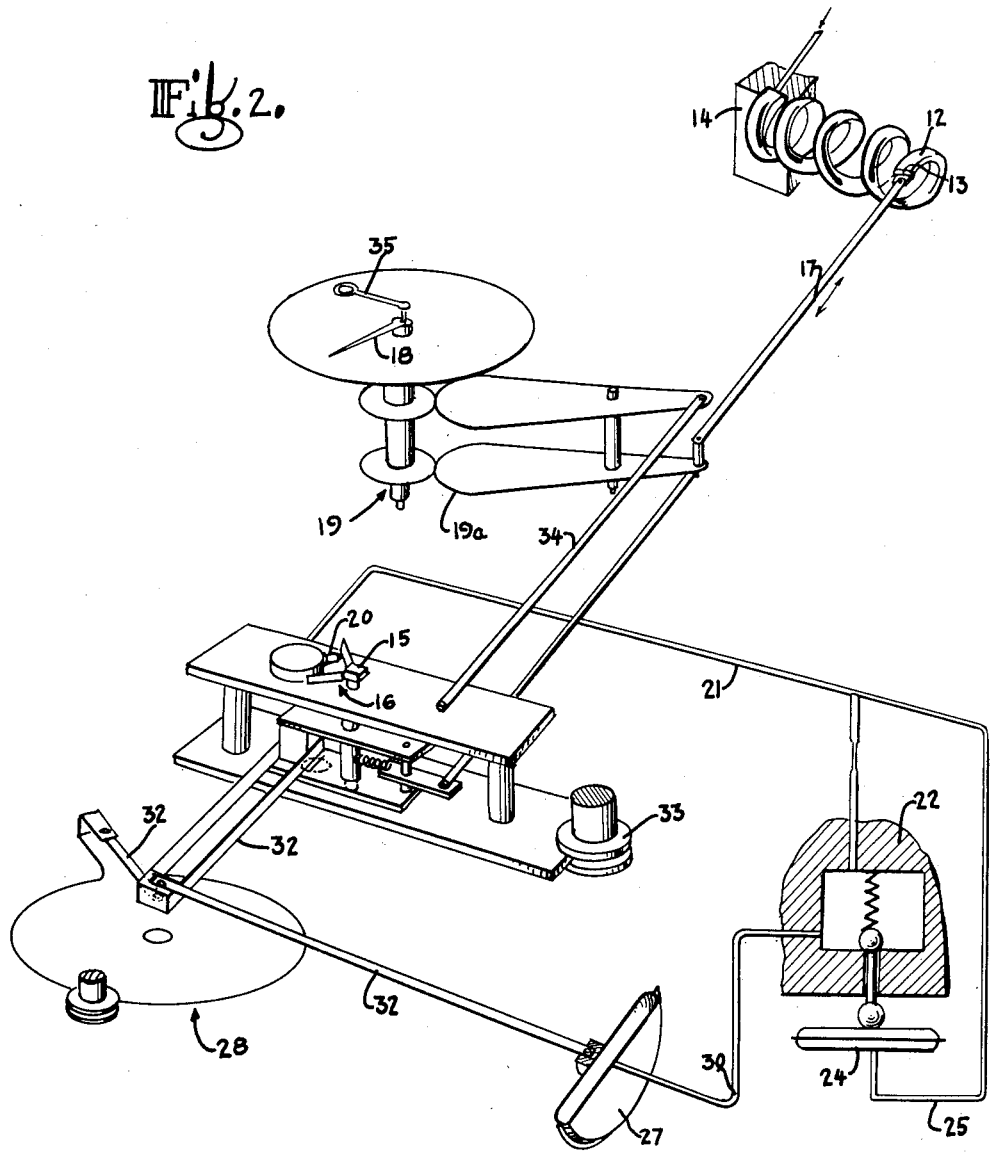

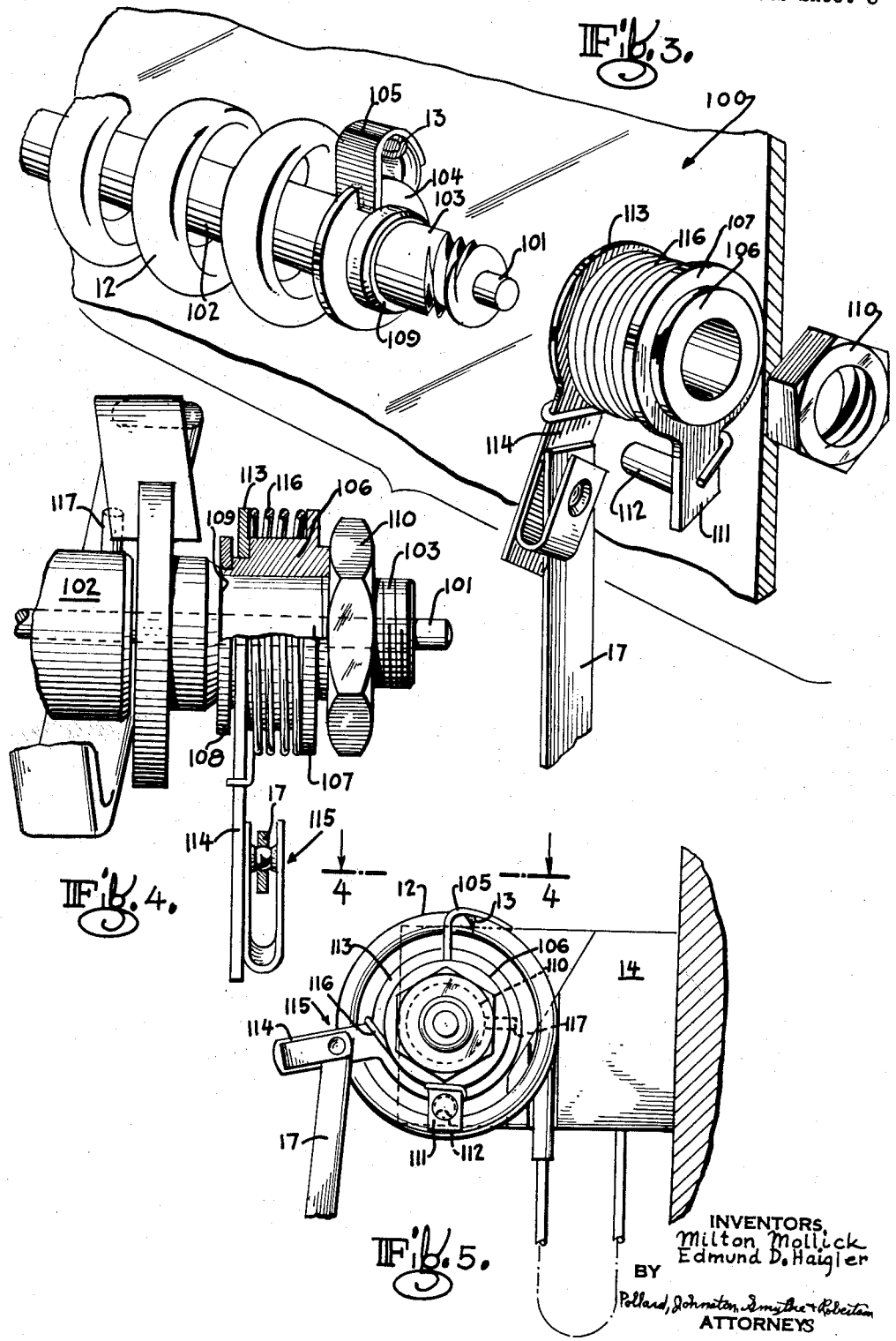

United States Patent Office 2,932,973
Patented Apr. 19, 1960

2,932,973

INSTRUMENTS

Milton Mollick, Allentown, and Edmund D. Haigler, Hatboro, Pa., assignors to American Machine and Metals, Inc., New York, N.Y., a corporation of Delaware Application April 9, 1957, Serial No. 651,750

3 Claims. (Cl. 73—418)

This invention relates to condition control apparatus, and more particularly to condition control apparatus of the type wherein the condition sensing element produces mechanical motion at its output in response to changes in the condition being sensed.

In modern industrial control systems, it is often desired to employ condition control apparatus which controls a quantity in one system in accordance with a variable condition, such as pressure or temperature of another system. The output of such condition control apparatus may be employed to actuate a final control element such as a valve positioner located in the system being controlled, or the condition control apparatus itself may constitute the transmitter element in a telemetering system. The condition control apparatus employed for such uses may comprise a condition sensing element which actuates a transducer means through a controller device and associated linkage means. A feedback loop may be included in the condition control apparatus to regulate such system operating conditions as transient instability or "hunting" and proportional bandwidth or "throttling range."

The type of condition sensing element employed is, of course, determined by the characteristics of the variable condition being sensed. Accordingly, in systems where the condition to be sensed is pressure, the sensing element usually comprises a Bourdon tube which produces a mechanical motion at its output. Where the pressure to be sensed is very high, Bourdon tubes of the helical type are employed, since they offer the advantages of compactness and large mechanical output motion. The use of such helical Bourdon tubes offers the disadvantage, however, that the very magnitude of their output motion may damage the operating parts of the condition control apparatus should the normal operating range of the apparatus be exceeded. Accordingly, the condition control apparatus should be constructed to accommodate possible undertravel or overtravel of the Bourdon tube and yet permit an accurate transmittal of the output motion of the Bourdon tube to the operating parts of the apparatus.

It is, therefore, an object of this invention to provide condition control apparatus suitable for use with a condition sensing element which produces mechanical motion at its output in response to changes in the condition being sensed.

A further object of this invention is to provide condition control apparatus which is suitable for use with a condition sensing element of the helical Bourdon tube type and wherein provision is made for protecting the operating parts of the apparatus from damage due to undertravel or overtravel of the Bourdon tube.

Briefly, the invention relates to condition control apparatus including a two-part controller device, the parts of which are movable relates to each other, a condition sensing element adapted to produce mechanical motion at its output in response to the condition being sensed, undertravel protection means, linkage means connecting the undertravel protection means to one part of the controller device, and transducer means actuated by the output of the controller device. The undertravel protection means comprises movable means responsive to the mechanical motion produced by the condition sensing element, connective means, means limiting the movement of said connective means in one direction, and flexible means joining said connective means to said movable means for rotation therewith in said one direction until the limit of movement of said connective means in said one direction is reached, at which point the movable means can move further in said one direction against the action of said flexible means without further movement of the connective means.

These and other objects, advantages and features of the invention will become apparent from the following description and drawings which are merely exemplary.

In the drawings:

Fig. 2 is a schematic view of the condition sensing element and associated parts of the apparatus;

Fig. 3 is a detailed perspective view of the condition sensing element and the undertravel protection means showing the parts in their undertravel accommodating position;

Fig. 4 is a detailed view with parts broken away and parts shown in cross-section of the undertravel protection means; and Fig. 5 is an end view of the undertravel protection means.

Figure 1:
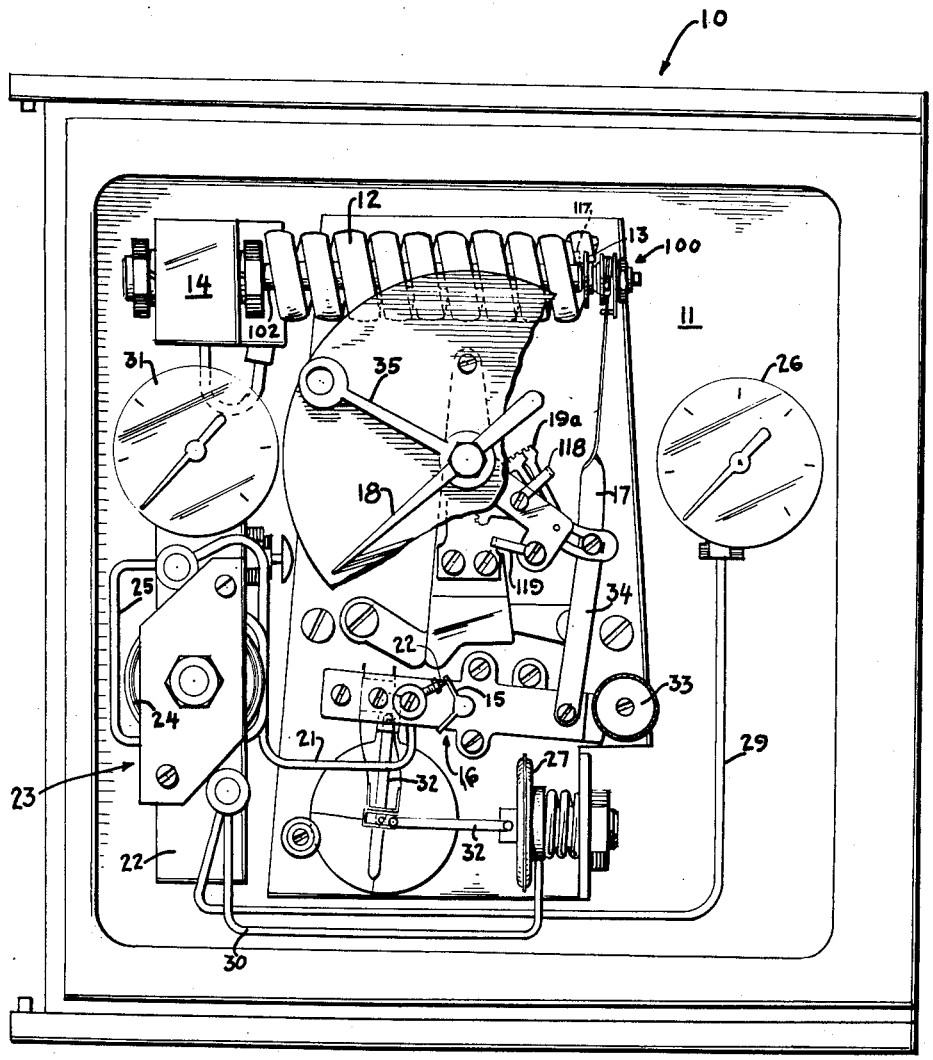
Fig. 1 is a front elevation of condition control apparatus constructed according to the invention.

Referring now to Figs. 1 and 2 of the drawings, in which is shown a preferred embodiment of the invention, the condition control apparatus is enclosed by a housing 10 which has a back plate 11 upon which is mounted the condition sensing element 12. The condition sensing element comprises a Bourdon tube of the helical type which produces a mechanical motion at its free end 13 in response to changes in the pressure being sensed. The connection to the source of variable pressure from the Bourdon tube is made by connecting block 14 which is affixed to the back plate 11. The free end 13 of the Bourdon tube is connected to the flapper element 15 of a two-part controller device 16 through overtravel protection means 100 and linkage means 17. For a detailed description of the linkage means and two-part controller device, reference is made to copending application Serial No. 456,261, filed September 15, 1954, now Patent No. 2,770,247. The linkage means 17 also serves to position the pointer 18 of suitable indicating means through a sector gear and pinion arrangement, shown schematically at 19 in Fig. 2, to provide a visual indication of the pressure being sensed. A nozzle 20 comprises the other part of the two-part controller device 16 and is connected to a source of supply pressure by means of line 21 and connecting block 22. As explained in the aforesaid copending application, block 22 has a restriction therein which serves to control the pressure applied to nozzle 20. Thus, as flapper element 15 is moved in response to changes in the sensed pressure, it varies the back pressure in line 21 in a manner well known in the art.

A transducer means or pressure relay is indicated at 23 and may be of the type disclosed in copending application Serial No. 461,276, filed October 8, 1954. The variable back pressure in line 21 is transmitted to the actuating element 24 of the relay by means of line 25. The input of the relay is connected to a source of supply pressure (not shown) through an aperture in connecting block 22, while its output is applied to gauge 26 and the actuating element 27 of selectively operable feedback means 28 by means of lines 29 and 30, respectively. A pressure gauge 31 is provided in the supply pressure line to indicate the pressure therein. The linear output motion of actuating element 27 is transmitted to the flapper element 15 of the two-part controller device by linkage means 32 and serves to modify the operation of the controller device, as described in the aforesaid copending application Serial No. 456,261.

As explained in said application, the feedback motion applied to flapper element 15 may be positive or negative, depending upon the setting of linkage means 32. Similarly, the control apparatus may be made direct or reverse acting, depending upon the position of nozzle 20 with respect to flapper 15. In order to vary the "set point" of the system, a knob 33 is arranged to rotate the carriage supporting both parts of the two-part controller device 16, while linkage 34 and pointer 35 provide a visual indication of the set point selected.

The operation of the described apparatus would be as follows:

Assuming a change in pressure, the Bourdon tube 12 will expand or contract, thereby moving the flapper element 15 by means of linkage 17. The movement of flapper 15 varies the back pressure in line 21 connected to nozzle 20, which change in back pressure is transmitted to actuating element 24 of relay 23. Relay 23 is then operative to vary its output pressure accordingly. The variation in output pressure is transmitted to the actuating element 27 of feedback means 28 by means of line 30, and the corresponding motion of actuating element 27 is transmitted to the flapper element 15 by means of linkage 32. Thus, depending upon the setting of linkage 32, positive or negative feedback or no feedback may be provided for in the system.

From the above description of the operation of the condition control apparatus, it will be evident that serious damage to the parts of the apparatus could occur if Bourdon tube 12 were to expand or contract beyond the normal operating limits of the apparatus. Accordingly, undertravel protection means 100 is included in the linkage between the sensing element 12 and the two-part controller device 16. Figs. 3-5 show the connections of the undertravel protection means to the free end 13 of the Bourdon tube 12 and the linkage means 17. A shaft 101 is press fit within rod 102. Rod 102 is affixed to connecting block 14. A hollow shaft 103 is rotatably mounted on shaft 101 and has a flanged portion 104 to which is connected one end of plate 105, the other end of which is connected to free end 13 of Bourdon tube 12. Plate 105 may be made of a spring material, such as a piece of hard bronze, thereby permitting it to flex without any radial load being transmitted to the shaft 101.

Mounted on shaft 103 is a hollow cylindrical body 106 having flanged portions 107 and 108, which is held firmly against a ledge portion 109 on shaft 103 by lock nut 110 so that it will rotate with shaft 103. Cylindrical body 106 may be preliminarily positioned as desired on shaft 103 by loosening nut 110, rotating body 106 to the desired position, and then locking it in the desired position by retightening nut 110. Flanged portion 107 has an outwardly extending leg 111 with a pin 112 mounted thereon parallel to shaft 103 and directed toward flanged portion 108. A disc 113 is rotatably mounted on the peripheral portion of body 106 between the flanged portions 107 and 108 and adjacent flanged portion 108. This disc has an outwardly extending leg 114 pivotally connected to linkage means 17 by a ball bearing arrangement shown generally as 115. Leg 114 is normally held against pin 112 by helical spring 116 so that as shaft 103 and body 106 rotate, leg 114 and disc 113 will rotate therewith, thereby moving linkage means 17 to operate the device in response to a change in the condition being sensed. In order to avoid damage to any of the parts of the device due to undertravel, a stop means 118, limiting the counterclockwise movement of disc 113 by limiting the movement of sector gear 19a in a clockwise direction, is provided. However, the Bourdon tube may continue to move beyond the desired limit. Should this occur, body 106 can continue to move in a counterclockwise direction against the action of the spring without causing further movement of disc 113 or of the remainder of the apparatus connected thereto through linkage means 17.

Under normal conditions, spring 116 will hold pin 112 against leg 114 since the ends of the spring are looped around opposite outer side edges of the leg 114 and the leg 111 secured to body 106. Movement of Bourdon tube 12 in a counterclockwise direction beyond the predetermined limit will not affect link 17 and leg 114 since link 17 cannot travel any further due to the action of stop means 118. However, such continued counterclockwise movement will result in continued counterclockwise movement of body 106, flange portion 107, leg 111, and pin 112. This latter movement, against the action of spring 116, will result in the movement of pin 112 away from leg 114. Thus the movement of Bourdon tube 12 in a counterclockwise direction (as seen in Fig. 3) beyond the predetermined limit will result in pin 112 being spaced from leg 114, as clearly seen in Figs. 3 and 5.

In order to prevent damage to the parts of the apparatus due to overtravel of the Bourdon tube, the clockwise movement, as shown in Fig. 3, of the Bourdon tube is directly limited by stop pin 117 on shaft 102 and sector 19a may be limited by stop means 119. From the above description it is evident that the undertravel protection means 100 permits movement within the normal predetermined limits of the condition control apparatus and in no way affects the accuracy thereof. Should the limits of travel be exceeded, however, the resistance of spring 116 is overcome and the extra motion of the free end of the Bourdon tube accommodated thereby.

By reversing the undertravel protection means 100, the device can be used to provide yieldable overtravel protection. This could be utilized, for example, in an apparatus having a range of 0-100 pounds requiring an overtravel range to 200 pounds. If desired, the action of stop pin 117 may also be reversed.

In order to permit easy adjustment of the device, hollow shaft 102 carrying stop pin 117 may be rotatably adjustable in block 14.

The device is particularly useful in obtaining high sensitivity for control or transmission, and thus enables the reading of pressures more accurately and with a closer degree of control. Due to the adjustability of parts 102, 103, and 106, the pressure at which the pointer will be at zero may be readily changed.

It should be apparent that modifications may be made in the construction and arrangement without departing from the spirit of the invention, except as defined in the appended claims.

What is claimed is:

1. In a safety connection for instruments having a condition sensing element adapted to produce mechanical motion at its output in response to changes in the condition being sensed; the combination comprising movable means responsive to the mechanical motion produced by the condition sensing element, said movable means being adjustable to any desired predetermined position relative to said condition sensing element, means for holding said movable means in its adjusted position, connective means, means limiting the movement of said connective means in one direction, means limiting the movement of the condition sensing element in the other direction, a helical spring connected at one end to said connective means and at the other end to said movable means thereby joining said connective means to said movable means for movement therewith in said one direction until the limit of movement of said connective means is reached, at which point the movable means can move further in said one direction against the action of said spring without further movement of the connective means, said connective means also moving in said other direction in response to the movement of said movable means.

2. In a safety connection for instruments having a helical Bourdon tube which produces mechanical motion at its free end in response to changes in the condition being sensed; the combination comprising a body rotatable in response to the mechanical motion produced by the Bourdon tube, a disc, means limiting the movement of the disc in one direction, a helical spring connected at one end to said disc and at the other end to said body thereby joining said disc to said body for rotation therewith in said one direction until the limit of movement of the disc in said one directon is reached, whereupon the body can rotate further in said one direction against the action of the spring without any further rotation of the disc.

3. In a safety connection for instruments having a helical Bourdon tube which produces mechanical motion at its free end in response to changes in the condition being sensed; the combination comprising a body rotatable in response to the mechanical motion produced by said Bourdon tube and having a radially extending leg thereon, a pin on said leg extending toward said Bourdon tube and parallel with its axis, a disc mounted about said body and having a radially extending leg adapted to contact said pin, means limiting the rotation of said disc in one direction, a single helical spring mounted on said body and engaging at one end the leg on said body and at the other end the leg on said disc so as to normally hold the leg on said disc in contact with said pin thereby permitting said disc to rotate with said body in said one direction until the limit of movement of the disc in said one direction is reached, whereupon the body can rotate against the action of the spring without causing further rotation of the disc, the leg on the disc and the pin becoming separated upon this continued rotation of the body due to the movement of said pin relative to the leg on said disc.

References Cited in the file of this patent

UNITED STATES PATENTS

| | | |
|---|---|---|
| 1,899,494 | Bowman | Feb. 28, 1937 |
| 2,203,057 | Moore | June 4, 1940 |
| 2,770,247 | Huston | Nov. 13, 1956 |